United States Patent
Carman et al.

Patent Number: 6,041,330
Date of Patent: Mar. 21, 2000

[54] SYSTEM AND METHOD FOR GENERATING YEAR 2000 TEST CASES

[75] Inventors: David Carman, Highland Park; Siddhartha R. Dalal, Bridgewater; Ashish Jain, Morristown; Nachimuthu Karunanithi, Wayne, all of N.J.

[73] Assignee: Telecordia Technologies, Inc., Morristown, N.J.

[21] Appl. No.: 09/119,499

[22] Filed: Jul. 20, 1998

Related U.S. Application Data

[60] Provisional application No. 60/053,645, Jul. 24, 1997.

[51] Int. Cl.⁷ ............................................. G06F 17/30
[52] U.S. Cl. ......................... 707/101; 707/1; 707/6; 707/7; 395/704; 395/705; 395/706
[58] Field of Search ............................. 707/1, 6, 7, 101; 395/704, 705, 706

[56] References Cited

U.S. PATENT DOCUMENTS

| | | | |
|---|---|---|---|
| 5,600,836 | 2/1997 | Alter | 707/101 |
| 5,630,118 | 5/1997 | Shaughnessy | 707/1 |
| 5,644,762 | 7/1997 | Soeder | 707/6 |
| 5,740,442 | 4/1998 | Cox et al. | 395/704 |
| 5,761,668 | 6/1998 | Adamchick | 707/101 |
| 5,794,048 | 8/1998 | Brady | 395/705 |
| 5,806,067 | 9/1998 | Conner | 707/100 |
| 5,808,889 | 9/1998 | Burgess | 364/737 |
| 5,809,500 | 9/1998 | Nolan | 707/6 |
| 5,838,979 | 11/1998 | Hart et al. | 395/707 |
| 5,852,824 | 12/1998 | Brown | 707/6 |
| 5,862,380 | 1/1999 | Brady | 395/704 |

*Primary Examiner*—Paul R. Lintz
*Attorney, Agent, or Firm*—Elizabeth A. Mark

[57] ABSTRACT

An innovative rule based method and system for creating test cases for the Year 2000 compliance testing of software systems is described. Using the method and system of the present invention, the user will first input information as rules relating to the business logic of the system. After obtaining the business logic, the system will transform input test cases into output test cases for the Year 2000 compliance testing. The term test cases, used in a broad sense here, refer to regression test cases written in any test automation languages, archive of test input/output data files, or snap shots of transactions captured using a recording tool. The system operates by first parsing the input files and based upon the business logic, it identifies date, time, or duration dependent variables or constants ("date dependent fields" collectively) in the input test cases. The system then substitutes risky dates, time, or duration for these fields in a manner which preserves the business logic. Risky values here refer to values that are important for the Year 2000 compliance testing—a set of values which may be user-defined. The system provides several modes of generation of output test cases depending upon the users' needs. The system can be retrofitted to deal with generation of test cases for any one time change to a software system. For example, when seven digits telephone numbers are replaced by ten digit numbers or various currencies are replaced by a single currency unit and so forth.

39 Claims, 5 Drawing Sheets

SYSTEM AND METHOD FOR GENERATING YEAR 2000 TEST CASES

CROSS-REFERENCE TO RELATED APPLICATIONS

This application is based on a provisional application, Serial No. 60/053,645, entitled YEAR 2000 TEST GENERATION FACTORY, filed Jul. 24, 1997, which is hereby incorporated by reference.

TECHNICAL FIELD

The present invention relates generally to systems and methods for testing applications for compliance with predetermined conditions and, more particularly, to systems and methods for determining whether applications are "Year 2000 compliant" and can correctly process dates from both the 20th and 21st centuries.

BACKGROUND ART

For decades, it has been common practice to represent the year in data processing systems using two digits instead of four. Thus, the year "1995" is represented (and often stored) using the two last digits "95." This practice minimized expensive memory space and data entry time.

In the Year 2000 ("Y2K"), many systems will interpret the two digit year "00" to mean the year 1900, an obviously undesirable result of dealing with dates represented using only two digits. This problem is acute, and if an organization does not take necessary steps to make its systems "Year 2000 compliant," then it may face severe business consequences. For example, records of credit card payments, IRS tax refunds and even air-traffic control systems that keep planes safely separated may be disrupted. A "Year 2000 compliant" system is one which can correctly operate with dates belonging to both the 20th and 21st centuries. Due to its scope and the time constraint, the Y2K "bug" fixing poses formidable challenges. The cost of fixing the Y2K problem worldwide is estimated to be in the hundreds of billions of dollars.

Considering the time and the resources required, automated tools will have a significant role to play in efforts to make applications Y2K compliant. Generally, Y2K conversion efforts involve a two-step process: first, the system must be converted to make it Y2K complaint and second, the system must be thoroughly tested to ensure that it has been correctly converted. The second "debugging" step often may turn out be more time-consuming and costly than the actual conversion step itself. While numerous automatic code/system conversion tools are now available for the first step of Y2K conversion efforts, a testing discipline and automated testing tools seem to be universally lacking for the second step.

DISCLOSURE OF THE INVENTION

To achieve the objects and in accordance with the purpose of the invention, as embodied and broadly described herein, the method of the present invention generating test cases for use in a Year 2000 compliance testing of a system under test, performed by a data processor, comprises: providing to the data processor one or more input test cases corresponding to the system under test; identifying according to a first set of predetermined criteria one or more date dependent fields in each of the one or more input test cases; and selectively generating according to a second set of predetermined criteria one or more output test cases, wherein at least one of the date dependent fields in each the output test case includes a risky date from a set of risky dates used for the Year 2000 compliance testing.

In another aspect, the invention comprises: an interface for receiving one or more input test cases corresponding to the system under test; a parser for identifying according to a first set of predetermined criteria one or more date dependent fields in each of one or more input test cases; and a generation component configured to selectively generate according to a second set of predetermined criteria one or more output test cases, wherein at least one of the date dependent fields in each said output test case includes a risky date from a set of risky dates used for the Year 2000 compliance testing.

In a further aspect, the computer-readable medium of the present invention capable of configuring a data processor to generate test cases for use in a Year 2000 compliance testing of a system under test, the medium comprising program code to cause the data processor to perform the steps of: identifying according to a first set of predetermined criteria one or more date dependent fields in each of one or more input test cases corresponding to the system under test; and selectively generating according to a second set of predetermined criteria one or more output test cases, wherein at least one of the date dependent fields in each said output test case includes a risky date from a set of risky dates used for the Year 2000 compliance testing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate implementations of the invention and together with the description, serve to explain the principles of the invention.

In the figures.

BEST MODE FOR CARRYING OUT THE INVENTION

Figure 1:
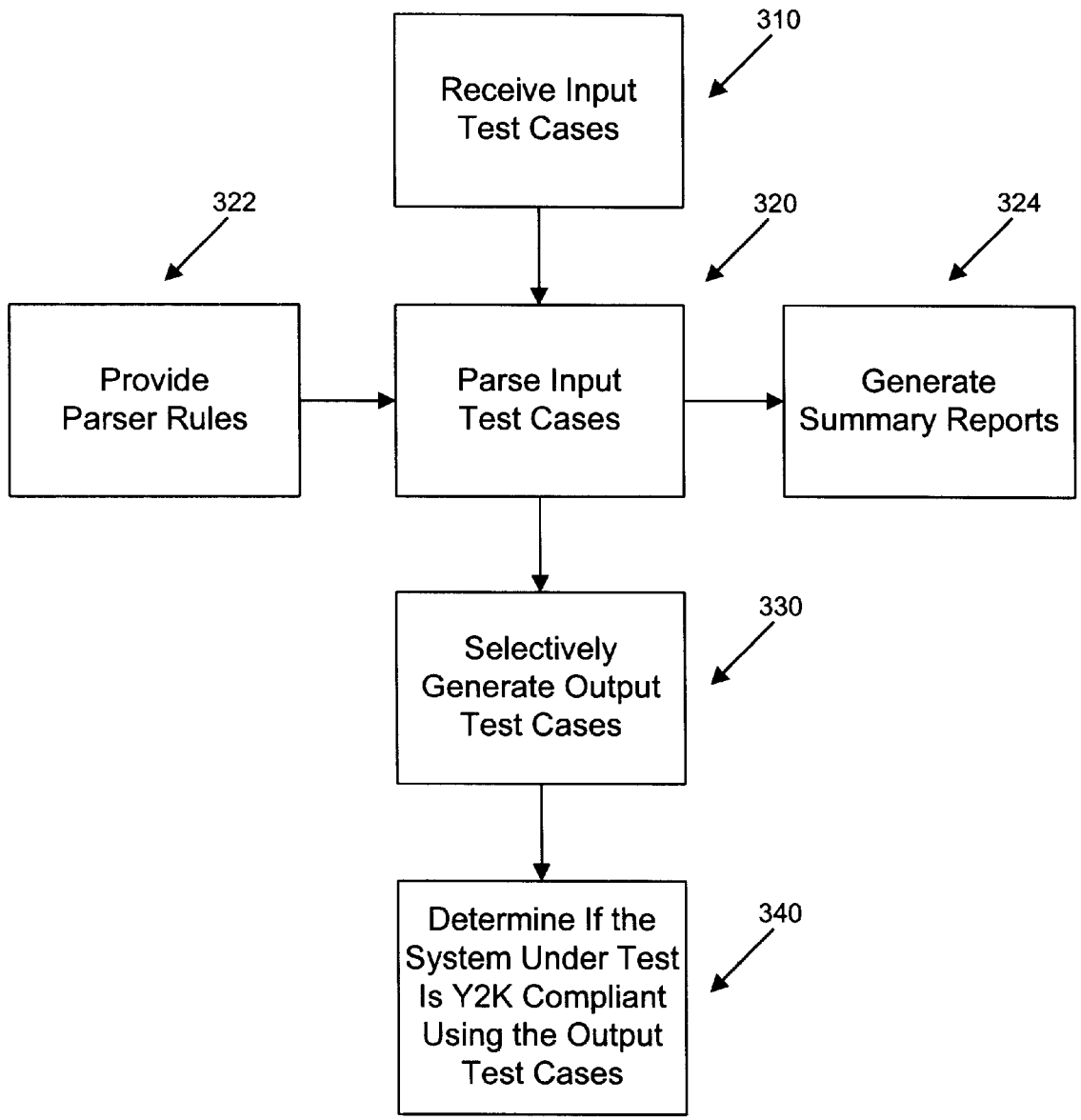
FIG. 1 is a flow chart, illustrating the steps performed by a system consistent with the present invention.

Reference will now be made in detail to the implementations of the present invention, an example of which is illustrated in the accompanying drawings. Where appropriate, the same reference numerals refer to the same or similar elements. The appended claims define the scope of the invention, and the following description does not limit that scope.

Systems and methods consistent with the present invention provide an innovative, automated rule based approach targeted for the testing aspects of Y2K conversion efforts. The systems and methods initially receive a set of so-called "input test cases" that include various fields involving dates, time, and durations, and then systematically enumerate various "output test cases" corresponding to scenarios involving dates, time, and durations which are likely to reveal whether a system under test ("SUT") is Y2K compliant. A test case contains various dates, time and durations and is generally of the format that can be conveniently inputted to the SUT for execution. An input test case has various date dependent fields, but do not necessarily have dates, time, and durations that are particularly relevant for the Y2K conversion testing. For example, an input test case may be derived from snap shots of ordinary transaction data captured using a recording tool.

Based on the input test cases, the systems and methods consistent with the present invention generate output test cases. Output test cases will be of the same format as the input test cases, but contain the so-called "Year 2000 risky dates"—dates, time and durations that are likely to reveal any defects in the SUT with respect to the Y2K conversion. Those Y2K risky dates, for example, include: Dec. 31, 1999; Jan. 1, 2000; and Feb. 29, 2000. The output test cases containing these Y2K risky dates may subsequently be executed by the SUT to determine if the SUT has successfully been converted.

The systems and methods consistent with the present invention have applications beyond the Y2K compliance testing. They can be retrofitted to deal with generation of test cases for any one time change to a software system. For example, those applications may include situations where seven digit telephone numbers are replaced by ten digit numbers, area code changes, or various currencies are replaced by a single currency unit, and so forth.

FIG. 1 is a flow chart illustrating the steps executed by a system consistent with the present invention. The system receives input test cases (step 310). Time and effort required for generating the input test cases for the system are minimized because the system uses either existing test cases or test cases that are readily generated by recording ordinary transactions from the SUT. One such commercially available recording tool (also referred to as a test harness) is MYNAH 4.3. This step of receiving input test cases (step 310) is carried out through a User Interface ("UI") and is discussed in greater detail in the section on the UI below.

Next, the system consistent with the present invention scans the input test cases and identifies date dependent fields, as well as relevant non-date fields (referred to as "token" fields hereinafter) in the input test cases and the locations thereof (step 320). This step of scanning and identifying is referred to as the "parsing" step. The parsing step is carried out by the system based on the parser rules provided by the user and by the system regarding the format of the input test case as to where and in what format the date dependent fields and token fields are within the input test case (see step 322). In this parsing step, the system may also generate summary reports for the user, indicating if any of the user-provided parser rules are potentially incorrect or incomplete (see step 324). A set of user-provided parser rule is potentially incorrect if, for example, a date value was not found at the field that the user indicated to be a date dependent field. A user-provided parser rules may be potentially incomplete if the system during the parsing step encounters date dependent fields that were not accounted for by any of the user-provided parser rules. The user may review the summary reports and modify the parser rules as needed. This parsing step is carried out by a Parser Engine ("PE") and is discussed in greater detail in the section on the PE below.

Once the system has identified and located the date dependent fields and relevant non-date fields in the input test cases, the system selectively generates output test cases (step 330). The output test cases are essentially copies of the input test cases and are of the same format as the input test cases. However, the date dependent fields of the output test cases contain the Y2K risky dates, such as Dec. 31, 1999 and Jan. 1, 2000. Note that the output test cases are selectively generated. To illustrate, consider a relatively simple situation, where there are ten date dependent fields in a test case and three risky dates to be tested. Without selective generation, the total possible test cases would be $3^{10}$, or almost 60,000. This step of selective generation of output test cases is carried out in two steps by a Generation Engine ("GE") and a Substitution Engine ("SE") and is discussed in greater detail in the sections on the GE and SE below.

The output test cases containing these Y2K risky dates may subsequently be executed by the SUT to determine whether defects exist causing the SUT to fail the Y2K compliance testing (step 340). In one implementation, this is done by first executing the output test cases on the SUT and comparing the SUT outputs therefrom with the SUT outputs that are already known to be correct. One way to generate the SUT outputs that are already known to be correct is to use a rule known as the 28-year repeat rule. This step of determining whether the SUT is Y2K compliant using the output test cases is carried out by the Output Simulator ("OS") and is described in greater detail in the section on the OS below.

Figure 2:
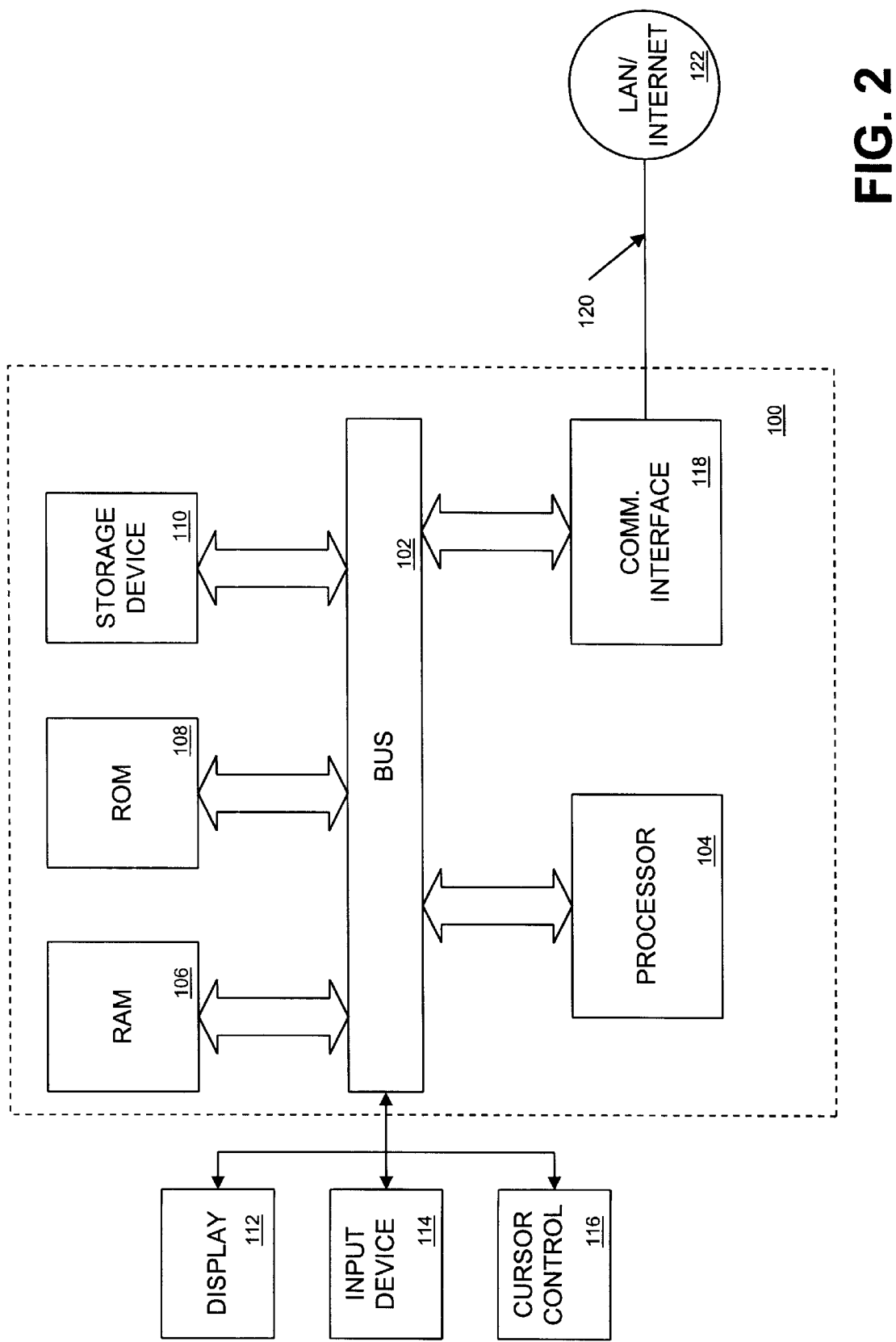
FIG. 2 is a block diagram showing an architecture for a computer system with which systems consistent with the present invention may be implemented.

FIG. 2 illustrates the system architecture for a computer system with which systems consistent with the present invention may be implemented. Computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. The term "computer-readable medium" as used herein refers to any media that participates in providing instructions to processor 104 for execution. Such a medium may take many forms, including, for example, a floppy disk, a flexible disk, hard disk, magnetic tape, or any other magnetic medium, a CD-ROM, or any other medium from which a computer can read.

Computer system 100 also includes a communication interface 118 coupled to bus 102. Communication interface 118 provides a two-way data communication coupling to a link 120 that is connected to a network 122. For example, communication interface 118 may be a local area network (LAN) card or an integrated services digital network (ISDN) card or a modem to provide a data communication connection to a LAN or to the Internet and the World Wide Web ("WWW").

A Y2K test generation environment consistent with the present invention may be implemented using computer 100. The Y2K test generation environment may also be accessible via the Internet or the World Wide Web ("WWW"). Processor 104 executes one or more sequences of one or more instructions of the Year 2K test generation environment, which may be stored in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

Figure 3:
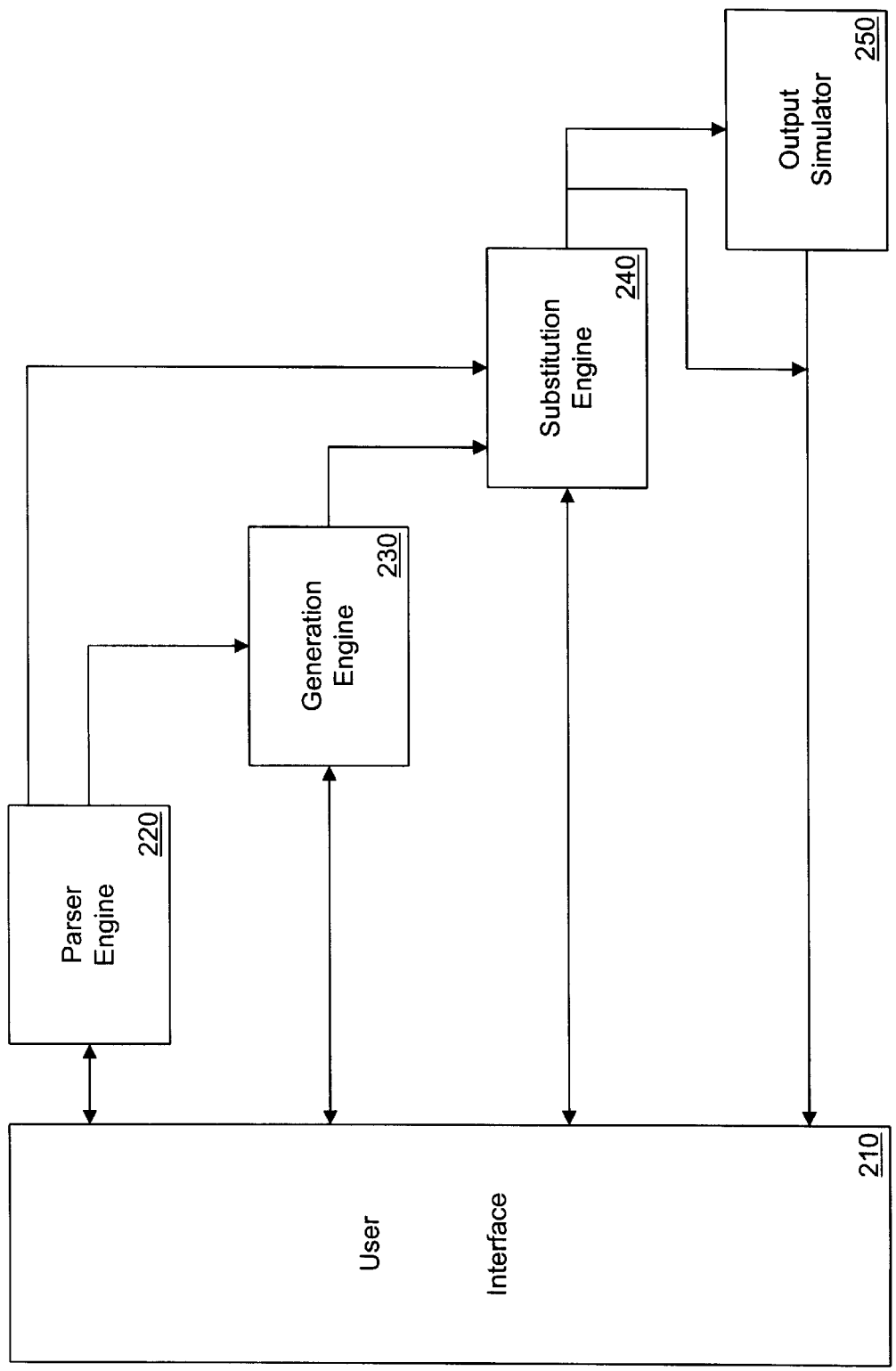
FIG. 3 is a block diagram of five main modules consistent with the present invention.

FIG. 3 shows five modules of a system consistent with the present invention: (1) User Interface ("UI") (210); (2) Parser Engine ("PE") (also referred to as Identification or Scanner Engine) (220); (3) Test Generation Engine ("GE") (230); (4) Substitution Engine ("SE") (240); and (5) Output Simulator ("OS") (250).

Each of the five modules is explained in detail as follows.

A. User Interface ("UI")

Interaction between the system of the present invention and the user occurs through UI. The user inputs to the system includes: (1) actual input test cases along with a catalog file that lists the file names of the input test cases; (2) parser rules for identifying date dependent fields within the input test cases; (3) parser rules for identifying non-date fields (referred to as "token fields" hereinafter) that may be necessary for generating output test cases; (4) information about the recording tool (also referred to as the test harness) used to capture the input test cases; (5) a list of risky dates, such as Dec. 31, 1999, Jan. 1, 2000, and holiday information; (6) rules expressing constraints among dates; and (7) other miscellaneous information such as the name of the directories where the output test cases should be stored.

In one implementation, the Y2K test generation system's user interface provides a World Wide Web ("WWW") based interface for the users to interact with the system. This allows even distantly located users (and systems under test) to provide input test cases over the WWW to the Y2K test generation system of the present invention and to receive the output test cases over the WWW so that the Y2K compliance testing may be done locally where the users are located.

1. Secured Access (UI)

In one implementation, the user interface is developed on the WWW, and anybody can access the system if they know the uniform resource locator ("URL") and have a generally available commercial Web Browser. To prevent unauthorized access to the Y2K test generation system consistent with the present invention, a password based security feature may be provided. Thus, only users with correct log-in names and password will be able to access and use the test generation system. The system also may provide different levels of security and access permission for the users. For example, an administrator of the Y2K test generation system will be able to log in with all possible access permissions, while others may not be able to get permission to see information about other users of the system or data. Once a user logs in, the current session remains active until the user ends the session or is not actively using the system for a predetermined period. Thus, a timeout mechanism is maintained for each user to make sure that leaving the browser on will not compromise sensitive data. This security feature facilitates not only for the users, but also for running the service both within corporate intranets and Internets at large from within corporate fire walls.

2. Inputs Through Setup Pages (UI)

Depending on the user's privilege, different initial pages are displayed for different users. Thus, UI (210) allows customization of the look-and-feel of the Y2K test generation system of the present invention for individual users. Normal users may start accessing the Y2K system with a top level setup page displaying a set of recording tools supported by the Y2K system. As explained above, a recording tool refers to the particular recording software used to record the system transactions to generate the input test cases. After selecting the recording tool, user may input additional information such as the location of the input test cases, target directory for output test cases and so forth. This initial setup page is configurable and provides enough flexibility to add new recording tools.

Apart from the main, high-level setup page, two additional setup pages may be provided to input information needed for Parser Engine 220 and Generation Engine 230 respectively. The second setup page allows the user to specify, browse and edit the parser rules for identifying date dependent fields and the catalog file. The third setup page is used to supply inputs for the Generation Engine 230 including the date formats to be used, the name of the file with constraints information, name of the file with risky dates, selection options for system-supplied risky dates versus user-supplied risky dates, and the specifying degree of optimization to be used to generate output test cases (compressed mode or exhaustive mode and so forth). These setup pages appear at the beginning of each phase of the system operation. The information collected from the user is properly validated, formatted and passed as input to respective engines. Thus, user inputs from the second setup page are passed to Parser Engine 220 and the inputs from the third setup page are passed to Generation Engine 230.

3. Browsing And Editing Input Information (UI)

UI 210 of the Y2K test generation system allows the user to browse all the input files (e.g., catalog file, parser rules, and rules expressing constraints among dates). Furthermore, UI 210 provides edit facility for modifying information contained in these input files. Thus at each setup page, the user can browse, as well as edit, the input information. For example, if the system suspects that a parser rule is incorrect (for example, if a date field was not found where the input parser rule indicated should be), UI 210 enables the user to edit the parser rules and resubmit the revised parser rules immediately. UI 210 dynamically adds appropriate Hypertext Markup Language ("HTML") markups to these files to provide easy navigation and links for editing relevant information. Edited versions of the files are stored back in the original format.

4. Browsing Parser Engine Outputs and Debugging (UI)

UI 210 presents to the user an Impact Analysis and Technical Summary report from the outputs of Parser Engine 220 and allows users to browse warnings and error messages generated by Parser Engine 220 at various levels of detail. For example, the high-level Impact Analysis information is dynamically generated by UI 210 from the output files of Parser Engine 220 and displayed as easy to understand metrics in tabular forms. The more detailed Technical Summary is dynamically generated by UI 210 from Parser Engine outputs to provide a detailed technical information such as the frequency of date fields within each input test case, file names and so forth. The Technical Summary is geared more towards Subject Matter Expert ("SME") while Impact Analysis summary is mainly meant for providing overall complexity of efforts involved. Summary information may be displayed in tabular and histogram formats.

Apart from browsing the summary information, the user can also browse the warning and error information for debugging purpose. The warning and error information is also presented in two levels: a summary and a detailed list. The summary information allows users to determine where problems occur during the parsing stage. The detailed list gives various categories of warnings and error information with exact location consisting of the file name, line number, column number within a line and the tag or the value where the error occurred. This information is generated dynamically with proper HTML markups to provide various visual clues and links to actual test scripts. By browsing and focusing on to the error locations identified by Parser Engine 220, user can easily modify the existing rules and rerun Parser Engine 220 to get a correct and complete rule base.

5. Summary Reports of Generation Engine's Output (UI)

UI 210 provides various summary information regarding output test cases generated. A summary information may be displayed in tabular and histogram formats. A short summary may provide information such as the number of output test cases generated, various user-supplied and system generated additional risky date values used in the output test cases and so forth. A detailed summary provides information such as the constraints honored in each date field and date values used. UI 210 also allows the user to browse newly generated output test cases at two levels: directory level and at individual file or test case level.

6. Display of Progress (UI)

UI 210 provides a status bar information to indicate the amount of processing done. This status information is provided for both Parser Engine 220 and Generation Engine 230.

7. Help Pages (UI)

UI 210 provides appropriate help pages and facilities at all levels. Thus, one can easily get instantaneous on-line help from within UI 210.

B. Parser Engine

Figure 4:
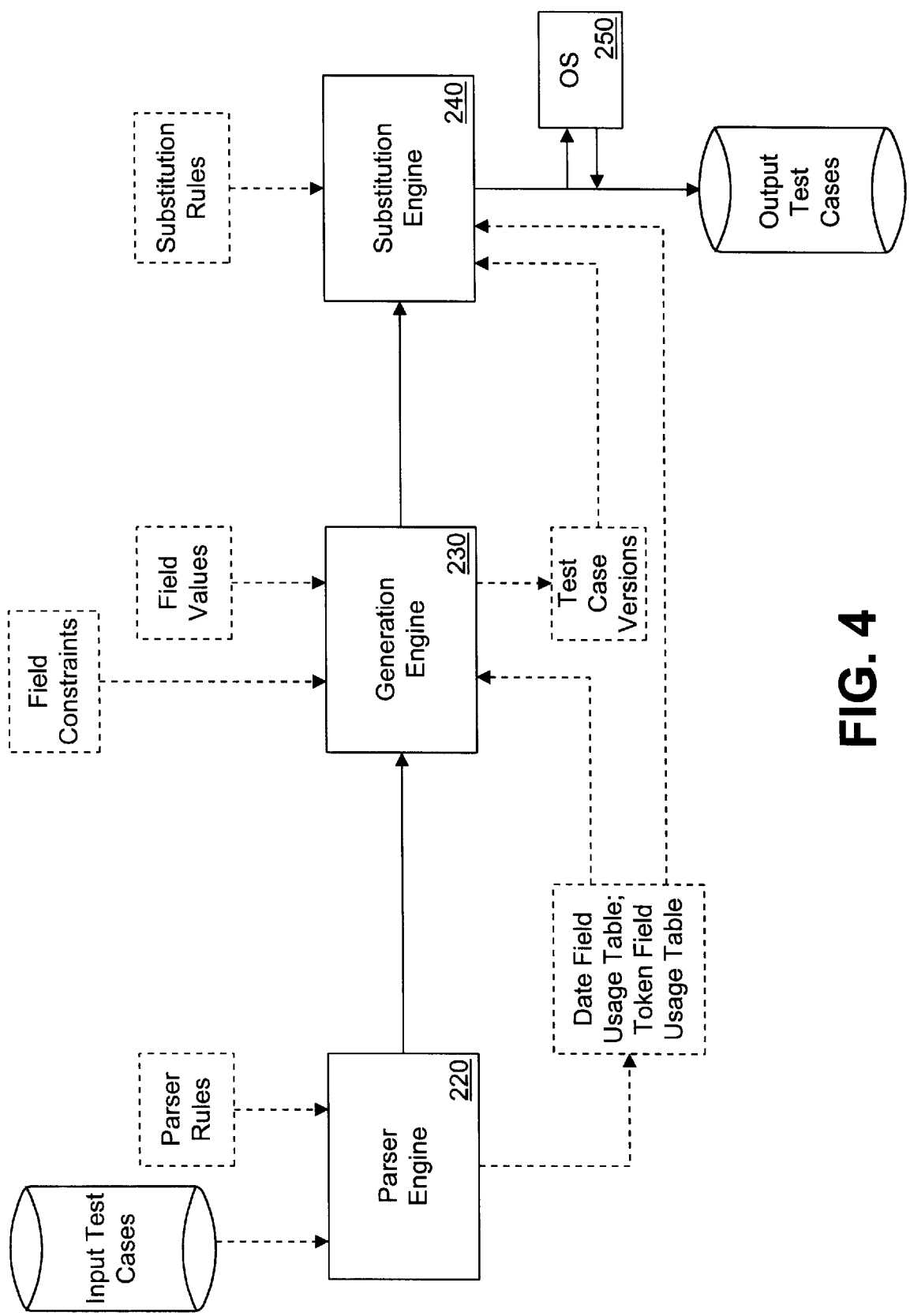
FIG. 4 is a block diagram, illustrating how Parser Engine, Generation Engine and Substitution Engine generate output test cases from input test cases in a manner consistent with the present invention.

FIG. 4 is a block diagram showing various inputs and outputs of Parser Engine 220, Generation Engine 230, and Substitution Engine 240. As shown in FIG. 4, inputs to Parser Engine 220 include: (1) one or more input test cases; (2) user-supplied parser rules for identifying date dependent fields; (3) user-supplied parser rules for identifying token fields that are relevant for generating output test cases; and (4) system-supplied parser rules for automatically identifying date dependent fields. Based on these inputs, Parser Engine identifies and locates the relevant date dependent fields and token fields in the input test cases.

The input test cases may be directly provided to the system or alternatively, a listing of the input test cases made be provided in a form of a catalog file. Parser Engine 220 scans the input test cases to look for input strings which match user-supplied or system-supplied default parser rules for identifying relevant date and token fields.

The parser rules are specified to Parser Engine 220 in the form of field definition tables. Based on these parser rules, Parser Engine 220 finds and logs all the matches in the appropriate field usage tables: (1) Date Field Usage Table ("DFUT") and (2) Token Field Usage Table ("TFUT"). First, date-dependent fields are recorded in DFUT. The date field usage table lists the occurrence of the particular field and the location of the field within the particular input test case. The date field usage table is subsequently used by Generation Engine 230 to generate the date values to be used in the output test cases. Second, non-date dependent fields are recorded in TFUT. The token field usage table lists the occurrence of the particular field and the location of the field within the particular input test case. The token field usage table is subsequently used by Substitution Engine 240 to create the output test cases.

In addition to creating field usage tables, Parser Engine 220 logs various warnings in a log-file, and UI 210 uses the log-file to provide feedback to the user at various levels of abstraction. Moreover, Parser Engine 220 may be optionally set to look for binary relationships (that is, less than, greater than, or equal to) between various date fields and log the information related to these relationships in a constraint frequency table.

Parser Engine 220 also has a built-in auto identification facility that the user may optionally invoke. When this option is invoked, Parser Engine 220 flags all the suspicious looking dates which are not accounted for by any of the user-provided parser rules. The Y2K system through UI 210 then may prompt the user to modify and/or add additional parser rules. The user may accept the suggestion. Alternatively, the user may override the suggestion if, for example, the user is not interested in the particular date field flagged by the Y2K system.

1. Input Files To Parser Engine

Parser Engine 220 receives the following input files.

a. Test Catalog File: Test Catalog File contains a hierarchical listing of input test files. The order of parsing the test cases is determined by the listing in the Test Catalog File.

b. Parser Rule Definition File: Parser Rule Definition File consists of a listing of rules which Parser Engine 220 employs for identifying relevant strings in the input test cases. The rules for identifying dates are distinguished from the rules for identifying tokens. There may be many date identifying rules. For example, parser rules for identifying dates may include: (1) offset type: This rule specifies exactly where (e.g., page and line numbers) in the particular input test case a date field would be found; and (2) date format type: This rule specifies the exact formats of the dates used in the input test case, such as "mm/dd/yy," "mm/dd/yyyy," or "dd/mm/yy."

c. System Date Modeling Table

Execution of some of the test cases may depend on the system clock (the current date and time). The dependence on the system clock may be implicit or may need to be explicitly modeled. Implicit modeling occurs when in a test case the value assigned to a field gets computed by a macro/function call or a Generic Date Rule and the value has SYS in it. This happens if the expression in the Macro/Function Call Identification Rule or the Generic Date Rule evaluates with the string__SYS in it. To explicitly model a test case's dependency on the system clock, one can use a System Date Modeling Table.

d. Auto Identification Patterns Table

Parser Engine 220 may optionally be set to look for suspicious date looking patterns in the input test cases which are not accounted for by any of the user supplied rules. User can adjust the level of auto identification using the Auto Identification Patterns Table ("AIPT"). The following is an example of AIPT.

| # North American | | | |
|---|---|---|---|
| nn-dd-yyyy | | y | _na |
| nn-dd-yy | | y | _na |
| yyyy-mm-dd | | y | _na |
| yy-mm-dd | | y | _na |
| mm-dd | y | _na | |
| yymmdd | | y | _user |
| mm/dd/yyyy | | y | _na |
| mm/dd/yy | | y | _na |
| yyyy/mm/dd | | y | _na |
| yy/mm/dd | | y | _na |
| mm/dd | y | _na | |
| # Asian/European | | | |
| dd-mm-yyyy | | n | _asia |
| dd-mm-yy | | n | _asia |
| dd-mm | n | _asia | |
| dd/mm/yyyy | | n | _asia |
| dd/mm/yy | | n | _asia |
| dd/mm | n | _asia | |
| dd.mm.yyyy | | n | _europe |
| dd.mm.yy | | n | _europe |
| # Turn-off directives | | | |
| MSTR | off | | |

Blank lines or lines whose first non-white character is # are comments and are ignored by Parser Engine 220. For other lines, an entry is given by a tab separated list of fields. The enumerated type (_na, _europe, _asia, or _user) is used to denote the grouping to which the entry belongs. The date formats above can be any regular expression; however, dd, mm, yy, yyyy, / and . have special meaning. / needs no escaping "dd," "mm," "yy," and "yyyy" cannot be used devoid of their special meaning. Format with no separators (e.g, mmddyy or mmdd) will match input patterns with specific number of bytes only. For example, mmddyy and mmdd will match 6 and 4 bytes patterns respectively; that is, 0404 belongs to mmdd but 044 does not.

A user can fine tune auto identification by: (1) modifying the date formats in first field; (2) selecting/unselecting the patterns using "y" or "n"; (3) adding new entries; (4) limiting the scope of an entry to a specific input test case type by indicating such limitation between the second and the third field; and (5) turning off the auto identification for certain file type. In the example above, auto identification is turned off for file types MSTR.

3. Parser Engine Output Files

Parser Engine 220 generates outputs to be used by Generation Engine 230. In addition to generating information for Generation Engine 230, Parser Engine 220 also provides feedback to UI 210. Information generated by Parser Engine 220 to be used by other components of the Y2K test generation system is described in this section.

a. Field Usage Tables

Every instance of date or token field Parser Engine 220 identifies is recorded in Date Field Usage Table and Token Field Usage Table respectively. DFUT is used by Generation Engine 230 and SE 240 and TFUT is used only by Substitution Engine 240.

(1) Date Field Usage Table

This table lists all instances of dates fields in each of the input test cases. The table lists the date and the location of each of the date fields.

(2) Token Field Usage Table

This table lists all instances of token fields in each of the input test cases. The table lists the token and the location of each of the token fields.

b. Parser Output Files—Constraint Frequency Table

Date constraints are binary relation of <, =, or > between two date types. After identifying all the instances for every date type, Parser Engine 220 may optionally list the number of input test cases for which the relations <, =, or > holds for any two date types. The following is a sample constraint frequency table.

| DD | DVA | 12 | 0 | 0 |
|---|---|---|---|---|
| DD | FCD | 12 | 0 | 0 |
| DD | _SYS | 0 | 0 | 0 |
| DVA | FCD | 12 | 0 | 0 |
| DVA | _SYS | 0 | 0 | 0 |
| FCD | _SYS | 0 | 0 | 0 |

In the above example, DD, DVA, FCD, and _SYS are the date types. The 3rd, 4th, and 5th columns respectively give counts of input test cases in which the date type given in the column is <, =, and > the date type given in the 2nd column.

c. Parser Output Files—Log-file

All the warnings encountered during the parsing stage may be logged into a log file. If a warning is encountered, Parser Engine 220 will output the line number where the warning occurs, and print the warning message on a new line. Various warning messages may include:

(1) Error in opening a file
(2) Missing field in a Rule
(3) Illegal offset in a Rule
(4) Mismatch between input and format in an Offset Date Rule
(5) Auto identified and unaccounted date constant 4. Parser Engine Processing Parser Engine processing takes place in three stages. The three stages are described in details here.

a. The Initialization Stage

In the first stage, Parser Engine 220 reads all the user-supplied parser rules. During initialization, Parser Engine 220 determines whether the user-supplied input rules are valid and when it encounters potential errors, it issues an appropriate warning.

b. The Parser Rules Processing Stage

In the second stage, Parser Engine 220 opens the test catalog file and parses the test cases in the order they are given in the catalog file.

c. The Rule Inference Stage Parser Engine may be optionally set to create a Constraint Frequency Table. This table was discussed in detail above.

C. Generation Engine (GE)

As shown in FIG. 4, Generation Engine 230 takes three kinds of input: (1) field constraints; (2) field values; and (3) Date Field Usage Table. These inputs are used by one of the generation algorithms to create a set of Test Case Versions ("TCV's") which populate each required field value into each field while maintaining the user-supplied constraints.

1. Inputs To GE a. Field Constraints

These are user-supplied field constraints. For example, if the input test case is a purchase order form with fields such as order date and ship date, then the order date must be always before the ship date. Field constraints ("FC") may be of the following form:

<Field₁><Operator><Field₂> where

Field$_N$ ::=field name

Operator ::='<'|'>'|'='|'/110'|'+5' and so forth

Some example FC entries may include:

"DUE_DATE<SHIP_DATE"

"ORDER_INVENTORY>STOCK_INVENTORY"

"Price(⌀)/110 Price($)"

"ITEM_COLOR=COLOR_ITEM"

Each operator ('<','>', '=','/110','+5', etc.) is used to infer allowable values in one field given a value in another related field. Given the value "10,000" in the "ORDER_INVENTORY" field, any value less than 10,000 is allowable in the "STOCK_INVENTORY" field. Given the value "990" in the "Price(⌀)" field, the field "Price($)" is allowed only one value "9".

b. Field Values

These are the various fields values that will be used to fill in the fields of the output test cases. They include the Y2K risky dates. Field values (FV) are of the following form:

<Alphanum><type> where

Alphanum ::=a string of alphanumeric characters type ::="required"|"optional"

Some example FV entries include:

"1999-12-31 required"

"2000-04-15 optional"

"990 required"

c. Date Field Usage Table

Date Field Usage Table is provided by Parser Engine 220. The table lists all instances of date fields and locations thereof within each input test case. The data is organized as a matrix of values indexed by the field names and the input test case names, as follows:

| Input Test Case | Field1 | Field2 | ... | FieldN |
|---|---|---|---|---|
| T1 | $V_{11}$ | $V_{12}$ | | $V_{1N}$ |
| T2 | $V_{21}$ | $V_{22}$ | | $V_{2N}$ |
| ... | | | | |
| TM | $V_{M1}$ | $V_{M2}$ | ... | $V_{MN}$ | where $T_M$ ::=test case

Field N ::=field name

V(m,n)::=null|<Value_Used><Position_List>

Position_List ::=<Position>|<Position><Position_List> m ::=test case index n ::=field index

Value_Used ::=Alphanumeric string

Position ::=filename, position and length

2. Outputs of GE

Test Case Versions

The generation algorithm will take the field constraints ("FC"), the field values ("FV") and Date Field Usage Table data structures, and it creates a test case versions ("TCV") data structure. The TCV structure contains a single row for each newly generated test case. The columns correspond to the field names from the field usage structure. Each cell contains the generated value to be used during substitution.

The value stored in each cell is determined by one of the generation algorithms from the next section. The data is organized as a matrix of values indexed by the logical field names and the logical test case names.

| Output Test Case | Field1 | Field2 | ... | FieldN |
|---|---|---|---|---|
| T10 | $V_{110}$ | $V_{120}$ | | $V_{1N0}$ |
| T11 | $V_{111}$ | $V_{121}$ | | $V_{1N1}$ |
| ... | | | | |
| T1L(1) | $V_{11L(1)}$ | $V_{12L(1)}$ | | $V_{1NL(1)}$ |
| ... | | | | |
| TM0 | $V_{110}$ | $V_{120}$ | | $V_{N0}$ |
| TM1 | $V_{111}$ | $V_{121}$ | | $V_{1N1}$ |
| ... | | | | |
| TML(M) | $V_{11L(M)}$ | $V_{12L(M)}$ | | $V_{1NL(M)}$ | where

TML ::=version L of test case M

Field$_N$ ::=field name

V(m,n,l) ::=null|<Value> m ::=test case index n ::=field index l ::=version index

Value ::=Alphanumeric string

3. Generation Algorithm

The generation methods will use one of several possible means for placing values from the FV structure into generated test cases stored within the test case versions (TCV) structure. The goal of each generation method is to insure that all required field values get tested by each field from the DFUT structure. This goal is satisfied by creating new versions of test cases that contain values from the FV structure. Additionally, the FC field constraints are used to insure that the relationship between fields is maintained in the generated versions of each test case.

The progress toward attaining the goal is measured by determining the coverage of field values used in generated test cases against fields from the DFUT.

| | Field1 | Field2 | ... | FieldN |
|---|---|---|---|---|
| FV1 | $V_{11}$ | $V_{12}$ | | $V_{1N}$ |
| FV2 | $V_{21}$ | $V_{22}$ | | $V_{2N}$ |
| ... | | | | |
| FVP | $V_{P1}$ | $V_{P2}$ | ... | $V_{PN}$ | where

FVP ::=required field value

Field$_N$ ::=field name

V(p,n) ::=null|test case p ::=field value index n ::=field index

For example, suppose that:

a. Three required field values are "2000-01-01", "2000-02-29" and "2000-03-01".

b. Three fields for generation are "ORDER", "SHIP" and "DUE".

c. Two constraints are "ORDER<SHIP" and "SHIP<DUE".

In this example, the following matrix shows how four versions of a single input test case ($T_1$, $T_2$, $T_3$ and $T_4$) cover eight of the nine required combinations of field values and field names.

| Field Value | ORDER | SHIP | DUE |
|---|---|---|---|
| 2000-01-01 | T1 | T4 | * |
| 2000-02-29 | T2 | T1 | T4 |
| 2000-03-01 | T3 | T2 | T1 |

The following table lists the four versions of the test case T which provide the covering in the above matrix.

| Output Test Case | ORDER | SHIP | DUE |
|---|---|---|---|
| T1 | 2000-01-01 | 2000-02-29 | 2000-03-01 |
| T2 | 2000-02-29 | 2000-03-01 | 2000-02-01+1** |
| T3 | 2000-03-01 | 2000-03-01+1** | 2000-03-01+2** |
| T4 | 2000-01-01−1** | 2000-01-01 | 2000-02-29 |

Note
*After creating these four versions of the test case, the generation method creates the final, fifth test case to cover the required value "2000-01-01" in the field "DUE," corresponding to the "*" indicated in the table above.
Note
**Note that this field value is created to satisfy field constraints.

The generation methods share the same goal, but differ on how the goal is attained when multiple test cases use the same fields. The first generation method, Exhaustive Method, ensures that each value from FV is placed into each field of all test cases. This method treats each test case independently and therefore the largest total number of versions across all test cases is generated. The second (Compressed First Method) and third generation (Compressed All Method) methods ensure that each field value is tested in at least one test case. These two methods offer a form of "compressed" generation because they reuse the covering of field values across test cases. Fewer test cases will be generated using the second or third generation method. Note that not all of the original test cases will necessarily be included in the final output. The second and third methods differ in the order that they create multiple versions of test cases. The second method will create as many versions of the first input test case to fully test all field values for each field before attempting to generate new versions of any subsequent input test case. The third method will create one version of each input test case before creating any additional test case versions. This process continues by cycling through the list of input test cases. The fourth generation method (Compressed Method) generally follows the same processing steps as the third method, but it insures that all of the input test cases are included in the output test cases.

D. Substitution Engine ("SE")

As shown in FIG. 4, Substitution Engine (SE) takes output from Parser Engine 220 (Data Field Usage Table and Token Usage Field Table, providing the locations of fields) and output from Generation Engine 230 (Test Case Versions providing the size and content of manufactured test cases). This information is used to create copies of the input test cases that contain a replacement of the input field values with generated field values that include Y2K risky dates. Additionally, SE 240 will optionally replace other field values, such as token values, uniquely across test cases. This feature will be used when a field within a test case contains values that must be unique to each test case. For example, customer name in a point of sale system or part number in an inventory system may have to be different for each output test case.

Figure 5:
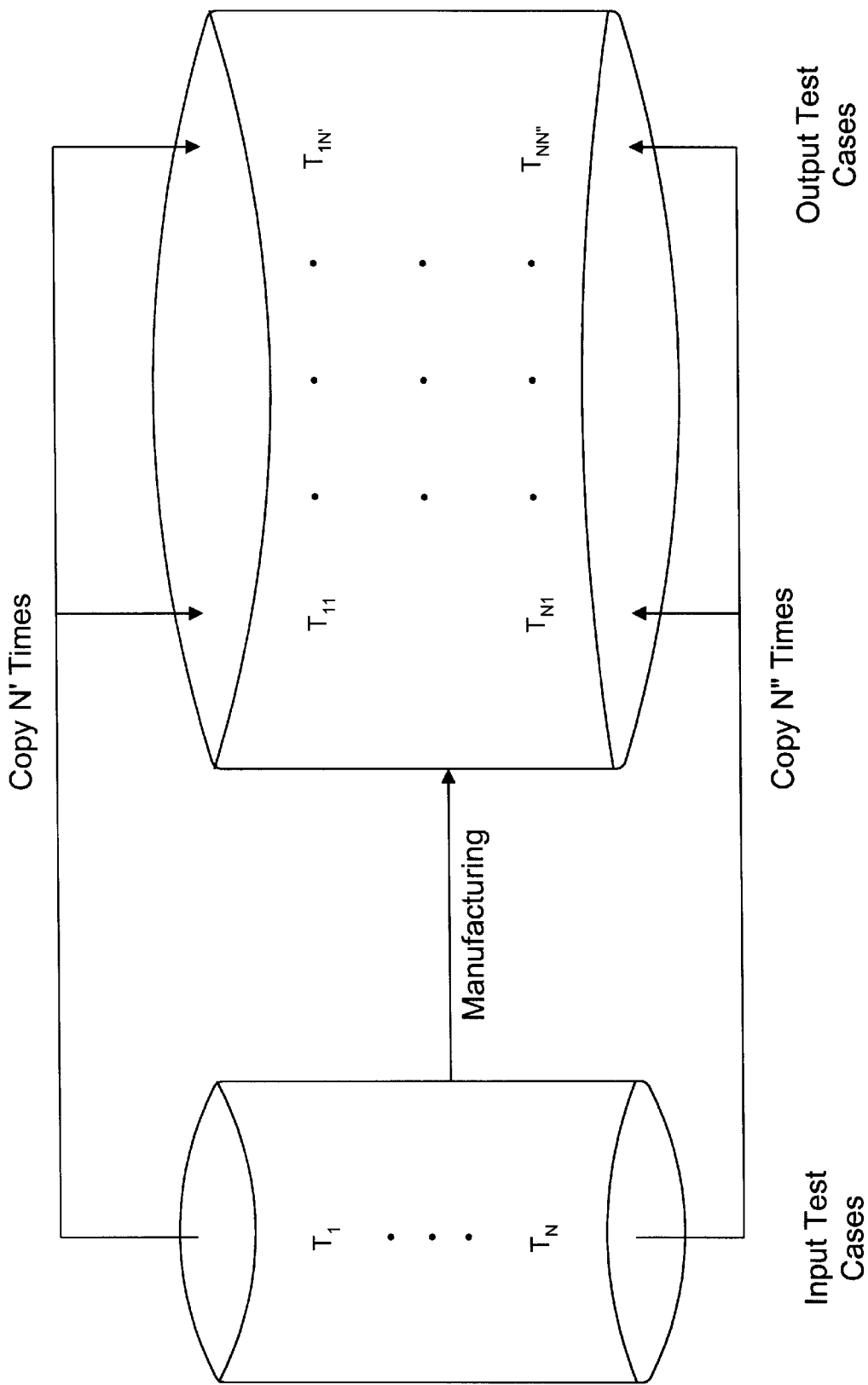
FIG. 5 is a block diagram illustrating how the output test cases are generated from the input test cases.

1. Inputs
  a. Substitution Rules
  The Substitution Rules (SR) are of the following form:

<name> <data type> <modifier> <value list>
where
  name      ::= label assigned to each type of field found by PE 220
  datatype  ::= "INTEGER" | "TEXT", etc.
  modifier  ::= "INCREMENT" | "CYCLE"
  value list ::= <value> | <value> ',' <value list>
  value     ::= alphanumeric characters Some example SR entries include:
  (1) "CustomerName TEXT CYCLE Jones,Smith, Zeller"
  (2) "PartNumber INTEGER INCREMENT 1000"
  (3) "Blues TEXT CYCLE Baby,Steel,Light,Navy"
  b. Date Field Usage Table
  c. Token Field Usage Table
  d. Test Case Versions
2. Outputs
  The output test cases may be created in directory structures, which are multiple mirrored copies of the original. FIG. 5 illustrates this copying process. Each of the input test cases ($T_1$ to $T_N$) is copied the appropriate number of times (N' to N" times, for example) according to a generation algorithm selected.

Another option for outputting the output test cases is to utilize "Parameterized Output Mode." Here instead of generating different files for the different versions of a test case, the users can decide to generate parameterized version of the test case. Under this option the system generates 1) a parameterized procedure (appropriate hard coded values, etc., are replaced by variables whose values can be called from a data file); 2) a driver routine for the procedure; and 3) a data file that contains the inputs for the parameters of the procedure. The driver routine is expected to open the data file, and for each row of data in the data file, it calls the procedure with the values of the parameters substituted with the actual data. This approach results in reduction of storage space and also improvement in maintenance of test cases.

3. Substitution Algorithm
  SE 240 carries out the substitution step in a three-stage process:
  a. Make copies of input test cases as needed. See FIG. 5.
  b. Replace input field values with generated values according to the TCV and Data Field Usage Table.
  c. Replace original field values with substitution values according to the SR and Token Field Usage Table.

E. Output Simulator ("OS")

In one implementation of the invention, the system of the present invention generates expected output for the Y2K compliance test cases as follows. For every output test case, say "T," the system creates two intermediate test cases, say "I1" and "I2." An intermediate test case is obtained by subtracting n*28 years from every date occurrence in T, where n is an integer greater than 0 such that after the subtraction, all dates are in the 20th century. "n" must be different for I1 and I2. Typically n=1 or 2. I1 and I2 are executed on the unrenovated system and the outputs O1 and O2 captured. The output test case is executed on the renovated system and the output O is captured therefrom. When doing Y2K compliance testing, O (output from T) must agree with O1 and O2 at places where O1 and O2 agree and differ where O1 and O2 differ. If this is not the case, then output test case T has uncovered a potential Y2K "bug" in the renovated system. Although only the n*28 method is discussed here, any other suitable testing methodology may be used. For example, the system outputs based on the output test cases of the present invention may be compared with other system outputs known to be correct.

F. Additional Capabilities

Although the system and method described herein are for Y2K compliance test case creation, the system and method of the present invention are applicable to any situation where mass changes following a consistent substitution pattern or rule were made to the source code. Examples of such changes are instances where: an input parameter type is changed from numeric to alphanumeric; the units used to specify inputs to the system are changed from lbs to kgs, or GMT to EST, and so forth; and telephone numbers are changed from seven digit to ten digit numbers. The systems and methods consistent with the present invention may be used to test such changes easily and rapidly by employing a set of appropriate "risky" values to be used when enumerating output test case scenarios.

It will be apparent to those skilled in the art that various modifications and variations can be made in the systems and methods of the present invention without departing from the scope or spirit of the invention. Other implementations of the invention will be apparent to those skilled in the art from consideration of the specification and practice of the invention disclosed herein. It is intended that the specification and examples be considered as exemplary only, with the true scope and spirit of the invention indicated by the following claims.

We claim:

1. A method of generating test cases for use in testing a system for Year 2000 compliance, comprising the steps of:

providing to a data processor one or more input test cases corresponding to the system;

identifying, according to a first set of predetermined criteria, one or more date dependent fields in each of the input test cases, using the data processor; and selectively generating according to a second set of predetermined criteria one or more output test cases, using the data processor, wherein at least one of the date dependent fields in each of said output test cases includes a risky date from a set of risky dates.

2. The method of claim 1, wherein said step of providing includes:

providing said one or more input test cases to the data processor through a World Wide Web.

3. The method of claim 1, wherein in said step of identifying, said first set of criteria includes automatic date-identifying rules provided by the data processor.

4. The method of claim 1, wherein said step of identifying includes:

generating reports of any potential errors detected during said step of identifying.

5. The method of claim 1, wherein in said step of identifying, said first set of criteria includes user-provided rules.

6. The method of claim 5, further comprising:

determining whether said user-provided rules are potentially incorrect.

7. The method of claim 5, further comprising:

determining whether said user-provided rules are potentially incomplete.

8. The method of claim 5, further comprising:

identifying user-provided rules that are potentially incorrect or incomplete; and allowing correction of some or all of the potentially incorrect or incomplete user-provided rules.

9. The method of claim 1, said step of selectively generating includes generating said one or more output test cases in one or more sets of output test cases, wherein said second set of predetermined criteria ensures that each set of output test cases corresponds to one or more of the input test cases.

10. The method of claim 9, wherein in said step of selectively generating, said second set of predetermined criteria ensures that each risky date from said set of risky dates is placed at least once into each date dependent field in each set of output test cases.

11. The method of claim 9, wherein in said step of selectively generating, said second set of predetermined criteria ensures that each risky date from said set of risky dates is placed at least once into each date dependent field in said output test cases.

12. The method of claim 9, wherein in said step of selectively generating, said second set of predetermined criteria ensures that each input test has at least one corresponding set of output test cases and that each risky date from said set of risky dates is placed at least once into each date dependent field in said output test cases.

13. The method of claim 1, wherein in said step of selectively generating, said second set of predetermined criteria ensures that said output test cases conform with user-supplied constraints.

14. The method of claim 1, further comprising:

providing said one or more sets of output test cases through a World Wide Web.

15. A method of generating test cases for use in testing a system for Year 2000 compliance, comprising the steps of:

providing to a data processor one or more input test cases corresponding to the system;

identifying, according to a first set of predetermined criteria, one or more date dependent fields in each of said input test cases, using the data processor;

selectively generating according to a second set of predetermined criteria one or more output test cases, using the data processor, wherein at least one of the date dependent fields in each of said output test cases includes a risky date from a set of risky dates; and determining whether the system under test is Year 2000 compliant by executing said output test cases in the system under test.

16. The method of claim 15, wherein said step of determining includes:

providing a first set of system outputs, said first set of system outputs generated by executing said output test cases in the system under test;

providing a second set of system outputs known to be correct; and comparing said first and second sets of system outputs to detect any potential errors in the system under test.

17. The method of claim 15, wherein said step of determining includes:

providing a first set of system outputs, said first set of system outputs generated by executing a first set of test cases, whose dates all belonging to the 20th century;

providing a second set of system outputs, said second set of system outputs generated by executing a second, different set of test cases, whose dates all belonging to the 20th century;

providing a third set of system outputs, said third set of system outputs generated by executing the output test cases;

comparing said first and second sets of system outputs; and determining whether the third set of system outputs agree and differ with the first set of system outputs where said first and second sets of system outputs agree and differ.

18. The method of claim 17, wherein said first and second sets of test cases are generated from said output test cases by subtracting n*28 years from every date occurrence in the date dependent fields of said output test cases, wherein n is an integer greater than 0 and n is different for said first and second sets of test cases.

19. A method of generating test cases for use in testing a system for Year 2000 compliance, comprising the steps, performed by a data processor, of:

identifying, according to a first set of predetermined criteria, one or more date dependent fields in each of one or more input test cases corresponding to the system under test; and selectively generating, according to a second set of predetermined criteria, parameterized versions of output test cases, wherein at least one of the date dependent fields in each of said output test cases includes a risky date from a set of risky dates, and wherein said parameterized versions, said versions being more compact than the output test cases, may be used to generate the output test cases.

20. A method of generating test cases for a conversion compliance testing of a system under test, comprising the steps of:

providing to a data processor one or more input test cases corresponding to the system under test;

identifying, according to a first set of predetermined criteria, one or more conversion dependent fields in each of the input test cases, using the data processor; and selectively generating, according to a second set of predetermined criteria, one or more output test cases, using the data processor, wherein at least one of the conversion dependent fields in each said output test case includes a risky conversion value from a set of risky conversion values.

21. The method of claim 20, wherein said conversion involves currency units.

22. The method of claim 20, wherein said conversion involves time units.

23. The method of claim 20, wherein said conversion involves measuring units.

24. A system for generating test cases for testing a system for Year 2000 compliance, comprising:

an interface for receiving one or more input test cases corresponding to the system under test;

a parser for identifying according to a first set of predetermined criteria one or more date dependent fields in each of the input test cases; and a generation component configured to selectively generate according to a second set of predetermined criteria one or more output test cases, wherein at least one of the date dependent fields in each said output test case includes a risky date from a set of risky dates.

25. The system of claim 24, said generation component is configured to selectively generate one or more output test cases in one or more sets of output cases, wherein said second set of predetermined criteria ensures that each set of output test cases corresponds to one or more of the input test cases.

26. The system of claim 25, wherein said second set of predetermined criteria ensures that each risky date from said set of risky dates is placed at least once into each date dependent field in each set of output test cases.

27. The system of claim 25, wherein said second set of predetermined criteria ensures that each risky date from said set of risky dates is placed at least once into each date dependent field in said output test cases.

28. The system of claim 25, wherein said second set of predetermined criteria ensures that each input test has at least one corresponding set of output test cases and that each risky date from said set of risky dates is placed at least once into each data dependent field in said output test cases.

29. A system for generating test cases for testing a system for Year 2000 compliance, comprising:

an interface for receiving one or more input test cases;

a parser for identifying, according to a first set of predetermined criteria, one or more date dependent fields in each of said one or more input test cases;

a generation component configured to selectively generate, according to a second set of predetermined criteria, one or more output test cases, wherein at least one of the date dependent fields in each said output test case contains a risky date from a set of risky dates; and a testing component configured to determine whether the system under test is Year 2000 compliant.

30. The system of claim 29, wherein said testing component comprises:

means for receiving a first set of system outputs, said first set of system outputs generated by executing a first set of test cases, whose dates all belonging to the 20th century;

means for receiving a second set of system outputs, said second set of system outputs generated by executing a second, different set of test cases, whose dates all belonging to the 20th century, wherein said first and second sets of test cases are generated from said output test cases by subtracting n*28 years from every date occurrence in said output test cases, wherein n is an integer greater than 0 and n is different for said first and second sets of test cases;

means for receiving a third set of system outputs, said third set of system outputs generated by executing the output test cases;

means for comparing said first and second sets of system outputs; and means for determining whether the third set of system outputs agree and differ with the first and second sets of system outputs where said first and second sets of system outputs agree and differ.

31. A system for generating test cases for Year 2000 compliance testing a system for, comprising:

a parser for identifying, according to a first set of predetermined criteria, one or more date dependent fields in each of one or more input test cases; and a generation component configured to selectively generate, according to a second set of predetermined criteria, parameterized versions of output test cases, wherein at least one of the date dependent fields in each said parameterized version of output test case includes a risky date from a set of risky dates, and wherein said parameterized versions, said versions being more compact than the output test cases, may be used to generate the output test cases.

32. A computer-readable medium capable of configuring a data processor to generate test cases for testing a system for Year 2000 compliance, the medium comprising program code to cause the data processor to perform the steps of:

identifying, according to a first set of predetermined criteria, one or more date dependent fields in each of one or more input test cases corresponding to the system under test; and selectively generating, according to a second set of predetermined criteria, one or more output test cases, wherein at least one of the date dependent fields in each said output test case includes a risky date from a set of risky dates.

33. The computer-readable medium of claim 32, wherein said step of selectively generating includes generating said one or more output test cases in one or more sets of output test cases, wherein said second set of predetermined criteria ensures that each set of output test cases corresponds to one or more of the input test cases.

34. The computer-readable medium of claim 33, wherein in said set of selectively generating, said second set of predetermined criteria ensures that each risky date from said set of risky dates is placed at least once into each date dependent field in each set of output test cases.

35. The computer-readable medium of claim 33, wherein in said step of selectively generating, said second set of predetermined criteria ensures that each risky date from said set of risky dates is placed at least once into each date dependent field in said output test cases.

36. The computer-readable medium of claim 33, wherein in said step of selectively generating, said second set of predetermined criteria ensures that each input test has at least one corresponding set of output test cases and that each risky date from said set of risky dates is placed at least once into each date dependent field in said output test cases.

37. A computer-readable medium capable of configuring a data processor to generate test cases for testing a system for Year 2000 compliance, the medium comprising program code to cause the data processor to perform the steps of:

providing to said data processor one or more input test cases;

identifying, according to a first set of predetermined criteria, one or more date dependent fields in each of said input test cases;

selectively generating, according to a second set of predetermined criteria, one or more output test cases, wherein at least one of the date dependent fields in each said output test case contains a risky date from a set of risky dates; and determining whether the system under test is Year 2000 compliant.

38. The computer-readable medium of claim 37, wherein said step of determining comprises:

providing a first set of system outputs, said first set of system outputs generated by executing a first set of test cases in the system under test, whose dates all belonging to the 20th century;

providing a second set of system outputs, said first set of system outputs generated by executing a second, different set of test cases in the system under test, whose dates all belonging to the 20th century, wherein said first and second sets of test cases are generated from said output test cases by subtracting n*28 years from every date occurrence in said output test cases, wherein n is an integer greater than 0 and n is different for said first and second sets of test cases;

providing a third set of system outputs, said third set of system outputs generated by executing the output test cases in the system under test;

comparing said first and second sets of system outputs; and determining whether the third set of system outputs agree and differ with the first and second sets of system outputs where said first and second sets of system outputs agree and differ.

39. A computer-readable medium capable of configuring a data processor to generate test cases for testing a system for Year 2000 compliance, the medium comprising program code to cause the data processor to perform the steps of:

identifying according to a first set of predetermined criteria one or more date dependent fields in each of the input test cases; and selectively generating, according to a second set of predetermined criteria, parameterized versions of output test cases in one or more sets of parameterized versions of one or more output test cases, wherein each set of parameterized versions of output test cases corresponds to one of the input test cases, wherein at least one of the date dependent fields in each said output test case includes a risky date from a set of risky dates, and wherein said parameterized versions, said versions being more compact than the output test cases, may be used to generate the output test cases.

* * * * *

UNITED STATES PATENT AND TRADEMARK OFFICE
CERTIFICATE OF CORRECTION

PATENT NO. : 6,041,330
DATED : March 21, 2000
INVENTOR(S) : David Carman - Siddhartha R. Dalal - Ashish Jain - Nachimuthu Karunanithi It is certified that error appears in the above-identified patent and that said Letters Patent is hereby corrected as shown below:

Column 18,
Lines 59-60, after "for" delete "Year 2000 compliance";
Line 60, after "system" delete "for".

Column 19,
Line 26, after "said", first occurrence, change "set" to --step--
Line 26, after "generating" delete ",".

Column 20,
Line 12, after "said" change "first" to --second--.

Signed and Sealed this

Third Day of July, 2001

*Attest:*

Nicholas P. Godici

NICHOLAS P. GODICI
*Attesting Officer*   *Acting Director of the United States Patent and Trademark Office*